(12) United States Patent
Feldman et al.

(10) Patent No.: US 10,814,983 B2
(45) Date of Patent: Oct. 27, 2020

(54) PAYLOAD ENGAGEMENT SYSTEMS, VEHICLES INCLUDING THE SAME, AND RELATED METHODS

(71) Applicant: The Boeing Company, Chicago, IL (US)

(72) Inventors: Allison M. Feldman, Kirkland, WA (US); Teresa Jeanna Konopka, Lynnwood, WA (US); Kristen Ann Leenerman, Seattle, WA (US); James Emanuel Silva, Bothell, WA (US); Matthew D. Uhlman, Kirkland, WA (US); Luis Rafael Vidal, Boston, MA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 15/954,426

(22) Filed: Apr. 16, 2018

(65) Prior Publication Data
US 2019/0315466 A1 Oct. 17, 2019

(51) Int. Cl.
*B64D 9/00* (2006.01)
*B64C 39/02* (2006.01)

(52) U.S. Cl.
CPC .............. *B64D 9/00* (2013.01); *B64C 39/024* (2013.01); *B64C 2201/027* (2013.01); *B64C 2201/108* (2013.01); *B64C 2201/128* (2013.01)

(58) Field of Classification Search
CPC ................................ B64D 9/00; B64C 39/024
See application file for complete search history.

(56) References Cited

U.S. PATENT DOCUMENTS

2007/0228215 A1* 10/2007 Hudson .............. B64D 11/0696
244/118.1
2014/0353994 A1 12/2014 Seshachalam et al.
(Continued)

FOREIGN PATENT DOCUMENTS

DE 102004035627 5/2006
DE 102016104418 9/2017
(Continued)

OTHER PUBLICATIONS

European Patent Office, Extended European Search Report for related European Application No. 19165955, dated Sep. 11, 2019.
(Continued)

*Primary Examiner* — Hilary L Gutman
(74) *Attorney, Agent, or Firm* — Dascenzo Gates Intellectual Property Law, P.C.

(57) ABSTRACT

Payload engagement systems, vehicles including the same, and related methods. A payload engagement system includes a vehicle supported portion and a payload mounted portion, one of which includes an insert component, and the other of which includes a receptor component. The payload engagement system is configured to transition between a disengaged configuration and an engaged configuration via rotation of the insert component with respect to the receptor component. In the engaged configuration, the receptor component receives the insert component such that the insert component is rotationally constrained within the receptor component. A method of transporting a payload with a vehicle includes engaging the payload with a payload engagement system that includes a vehicle supported portion and a payload mounted portion, transporting the payload with the vehicle, and disengaging the payload. Each of the engaging and the disengaging includes rotating the vehicle (Continued)

supported portion with respect to the payload mounted portion.

25 Claims, 7 Drawing Sheets

(56) References Cited

U.S. PATENT DOCUMENTS

2017/0158144 A1    6/2017  Wilckens et al.
2017/0267347 A1    9/2017  Rinaldi et al.
2020/0031472 A1*   1/2020  Martens ................. B64D 1/22

FOREIGN PATENT DOCUMENTS

EP    3556654 A1 * 10/2019  ............... B64D 1/22
WO    WO89/02988       4/1989

OTHER PUBLICATIONS

Machine-generated English translation of the abstract of WO89/02988, downloaded from Espacenet on Oct. 16, 2019.
Machine-generated English translation of the abstract of DE102004035627, downloaded from Espacenet on Oct. 16, 2019.
Machine-generated English translation of the abstract of DE102016104418, downloaded from Espacenet on Oct. 16, 2019.

* cited by examiner

PAYLOAD ENGAGEMENT SYSTEMS, VEHICLES INCLUDING THE SAME, AND RELATED METHODS

FIELD

The present disclosure relates to payload engagement systems, vehicles including the same, and related methods.

BACKGROUND

Vehicles such as aircraft may be used to deliver payloads to a delivery site. For example, unmanned aerial vehicles (UAVs) may be used to transport packages substantially autonomously. However, such applications generally require human interaction to place a package in the UAV's cargo area and/or to otherwise couple the package to the UAV and/or uncouple the package from the UAV. Such human interaction with a UAV may necessitate the use of special procedures and/or apparatuses to ensure the safety of the human user, especially when the UAV is intended to interact with an untrained human user such as the end recipient of a delivered package. For example, human interaction with a UAV may require the UAV to land and/or power off to couple the package to the UAV and/or to uncouple the package from the UAV, resulting in downtime between delivery runs.

SUMMARY

Payload engagement systems, vehicles including the same, and related methods are disclosed herein. A payload engagement system for selectively coupling a payload to a vehicle includes a vehicle supported portion configured to be supported by the vehicle and a payload mounted portion configured to be mounted on the payload. One of the vehicle supported portion and the payload mounted portion includes an insert component, and the other of the vehicle supported portion and the payload mounted portion includes a receptor component. The payload engagement system is configured to transition between a disengaged configuration and an engaged configuration at least partially via rotation of the insert component with respect to the receptor component. In the engaged configuration, the receptor component receives the insert component and engages the insert component such that the insert component is rotationally constrained within the receptor component to enable the vehicle to carry the payload.

A method of transporting a payload with a vehicle includes engaging the payload with a payload engagement system that includes a vehicle supported portion configured to be supported by the vehicle and a payload mounted portion configured to be mounted on the payload. The method further includes transporting the payload with the vehicle and disengaging the payload with the payload engagement system. The engaging includes rotating the vehicle supported portion with respect to the payload mounted portion to transition the payload engagement system from a disengaged configuration to an engaged configuration. The disengaging includes rotating the vehicle supported portion with respect to the payload mounted portion to transition the payload engagement system from the engaged configuration to the disengaged configuration.

DESCRIPTION

Figure 1:
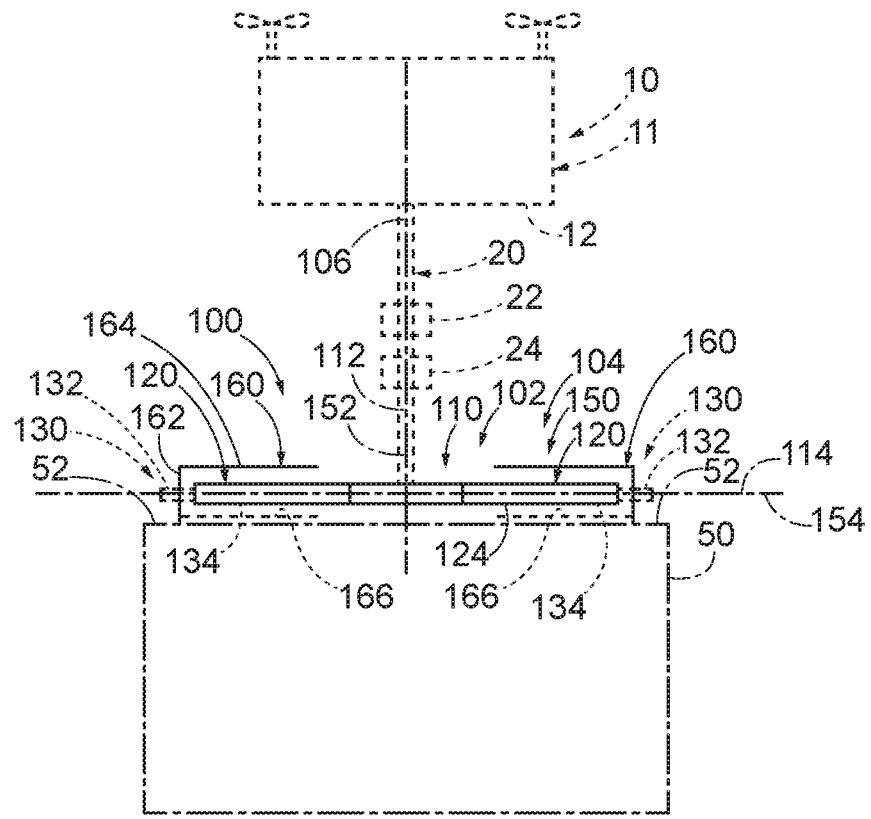
FIG. 1 is a schematic front elevation view representing examples of payload engagement systems according to the present disclosure.

FIGS. 1-12 provide illustrative, non-exclusive examples of payload engagement systems 100, of vehicle 10 including portions of payload engagement systems 100, and/or of methods 200 of transporting a payload with a vehicle, according to the present disclosure. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

Figure 2:
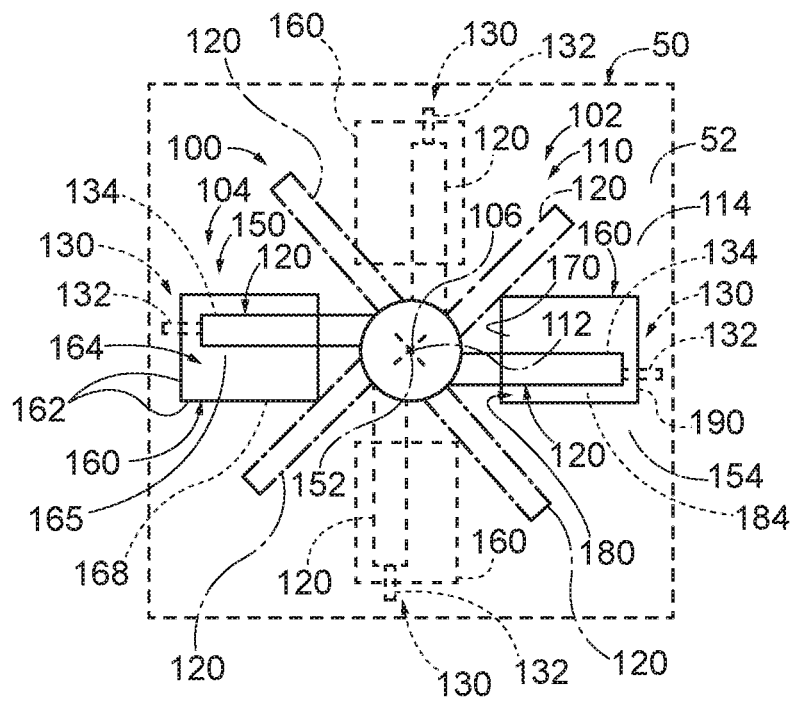
FIG. 2 is a schematic plan view representing examples of payload engagement systems according to the present disclosure.

FIGS. 1-2 are schematic illustrations of examples of payload engagement systems 100 and of payloads 50 according to the present disclosure. FIG. 1 additionally schematically illustrates an example of a vehicle 10 configured to support at least a portion of payload engagement system 100 and to carry payload 50 via payload engagement system 100. As schematically illustrated in FIGS. 1-2, a payload engagement system 100 for selectively coupling a payload 50 to a vehicle 10 (illustrated in FIG. 1) includes a vehicle supported portion 102 configured to be supported by vehicle 10 and a payload mounted portion 104 configured to be mounted on payload 50. One of vehicle supported portion 102 and payload mounted portion 104 includes an insert component 110, and the other of vehicle supported portion 102 and payload mounted portion 104 includes a receptor component 150. For example, in some examples of payload engagement system 100, vehicle supported portion 102 includes and/or is insert component 110, and payload mounted portion 104 includes and/or is receptor component 150. However, this is not required to all examples of payload engagement system 100 according to the present disclosure, and it is additionally within the scope of the present disclosure that vehicle supported portion 102 includes and/or is receptor component 150 and that payload mounted portion 104 includes and/or is insert component 110.

Payload engagement system 100 may be configured to be utilized in conjunction with any appropriate vehicle 10. For example, and as schematically illustrated in FIG. 1, vehicle 10 may include and/or be an aircraft 11. However, this is not required to all payload engagement systems 100 according to the present disclosure, and it is additionally within the scope of the present disclosure that vehicle 10 may include and/or be any appropriate vehicle for carrying a payload, such as a land-based vehicle, a water vehicle, a submersible water vehicle, and/or a space vehicle.

In an embodiment of payload engagement system 100 configured to be utilized in conjunction with aircraft 11, aircraft 11 may include and/or be any appropriate aircraft. As examples, aircraft 11 may include and/or be a rotorcraft, such as a rotorcraft that includes two rotors, three rotors, four rotors, or more than four rotors. Additionally or alternatively, aircraft 11 may include and/or be an unmanned aerial vehicle (UAV) and/or a drone. As more specific examples, aircraft 11 may be a remotely piloted UAV or may be an autonomously controlled UAV. Utilizing payload engagement system 100 in conjunction with aircraft 11 in the form of a UAV may facilitate transporting payload 50, such as a package, with little or no human intervention needed to couple payload 50 to aircraft 11 or to uncouple payload 50 from aircraft 11. Thus, for example, utilizing payload engagement system 100 in conjunction with aircraft 11 may facilitate coupling payload 50 to aircraft 11 or uncoupling payload 50 from aircraft 11 while aircraft 11 remains in flight, thereby increasing a delivery turnaround speed relative to a system in which aircraft 11 needs to land and/or power off between delivery runs.

Vehicle 10 may have any appropriate structure for supporting payload engagement system 100 and/or payload 50. For example, and as schematically illustrated in FIG. 1, vehicle 10 may include a vehicle body 12 and further may include a support structure 20 that extends from vehicle body 12 to support vehicle supported portion 102. In such an embodiment, support structure 20 may include a gimbal 22 configured to enable vehicle supported portion 102 to pivot with respect to vehicle body 12. Such a configuration may facilitate maintaining payload 50 in an upright orientation while vehicle 10 transports payload 50 independent of an orientation of vehicle 10.

Payload engagement system 100 is configured to transition between a disengaged configuration and an engaged configuration at least partially via rotation of insert component 110 with respect to receptor component 150. As an example, FIG. 2 schematically illustrates payload engagement system 100 in the disengaged configuration in dash-dot lines and schematically illustrates payload engagement system 100 in the engaged configuration in solid and dashed lines. Payload engagement system 100 may be configured such that insert component 110 rotates with respect to receptor component 150 about any appropriate axis. As an example, and as schematically illustrated in FIGS. 1-2, insert component 110 may have an insert component central axis 112, and insert component 110 may be configured to rotate with respect to receptor component 150 about insert component central axis 112 when payload engagement system 100 transitions between the disengaged configuration and the engaged configuration. Additionally or alternatively, and as additionally schematically illustrated in FIGS. 1-2, receptor component 150 may have a receptor component central axis 152, and insert component 110 may be configured to rotate with respect to receptor component 150 about receptor component central axis 152 when payload engagement system 100 transitions between the disengaged configuration and the engaged configuration. As another example, and as further schematically illustrated in FIGS. 1-2, insert component 110 may be configured to rotate with respect to receptor component 150 about a vertical axis 106 when payload engagement system 100 transitions between the disengaged configuration and the engaged configuration.

In the engaged configuration, receptor component 150 receives and engages insert component 110 such that insert component 110 is rotationally constrained within receptor component 150 and such that a weight of payload 50 is supported by vehicle supported portion 102. Stated differently, when payload engagement system 100 is in the engaged configuration, receptor component 150 engages insert component 110 such that vehicle 10 is enabled to lift payload mounted portion 104, and hence payload 50, via vehicle supported portion 102. In this manner, the engagement between insert component 110 and receptor component 150 enables vehicle 10 to carry payload 50 when payload engagement system 100 is in the engaged configuration. As more specific examples, payload engagement system 100 may be configured to support a payload weight that is at least 10 Newtons (N), at least 30 N, at least 50 N, at least 100 N, at least 300 N, at least 500 N, at most 1000 N, at most 700 N, at most 200 N, at most 70 N, and/or at most 20 N while the vehicle carries payload 50. The rotational constraint of insert component 110 within receptor component 150 when payload engagement system 100 is in the engaged configuration restricts payload engagement system 100 from transitioning to the disengaged configuration while vehicle 10 carries payload 50.

Payload engagement system 100 may be configured to rotate insert component 110 with respect to receptor component 150 in any appropriate manner. As an example, payload engagement system 100 may be configured to transition between the disengaged configuration and the engaged configuration via rotation of vehicle 10 with respect to payload 50 about insert component central axis 112 and/or receptor component central axis 152. Additionally or alternatively, and as schematically illustrated in FIG. 1, support structure 20 may include a rotary element 24 configured to rotate vehicle supported portion 102 with respect to vehicle body 12 and about insert component central axis 112 and/or receptor component central axis 152. In such an embodiment, vehicle 10 may not rotate with respect to payload 50 while payload engagement system 100 transitions between the disengaged configuration and the engaged configuration. By contrast, in an embodiment that lacks rotary element 24, transitioning payload engagement system 100 between the disengaged configuration and the engaged configuration may require and/or correspond to a rotation of vehicle 10 and/or vehicle body 12 with respect to payload 50. Stated differently, in an embodiment that lacks rotary element 24, transitioning payload engagement system 100 between the disengaged configuration and the engaged configuration may require and/or correspond to vehicle body 12 and vehicle supported portion 102 rotating at least substantially in unison.

In some examples of payload engagement system 100, payload engagement system 100 is configured to transition between the disengaged configuration and the engaged configuration via translation of insert component 110 with respect to receptor component 150 along (i.e., in a direction parallel to) vertical axis 106. In such an example, the rotation of insert component 110 with respect to receptor component 150 and the translation along vertical axis 106 may take place sequentially. As a more specific example, payload engagement system 100 may be configured to transition from the disengaged configuration to the engaged configuration via upward translation of vehicle supported portion 102 with respect to payload mounted portion 104 along vertical axis 106 subsequent to rotation of insert component 110 with respect to receptor component 150. Similarly, payload engagement system 100 may be configured to transition from the engaged configuration to the disengaged configuration via downward translation of vehicle supported portion 102 with respect to payload mounted portion 104 along vertical axis 106 prior to rotation of insert component 110 with respect to receptor component 150. In some examples of such an embodiment, the upward translation of vehicle supported portion 102 with respect to payload mounted portion 104 causes insert component 110 to be rotationally constrained within receptor component 150, and the downward translation of vehicle supported portion 102 with respect to payload mounted portion 104 causes insert component 110 to be free to rotate with respect to receptor component 150.

Insert component 110 and receptor component 150 may have any appropriate structure such that insert component 110 is selectively received within receptor component 150 as described herein. For example, and as schematically illustrated in FIGS. 1-2, insert component 110 may include at least two insert arms 120, and receptor component 150 may include at least two receptor units 160 corresponding to the at least two insert arms 120. As more specific examples, insert component 110 may include two insert arms 120, three insert arms 120, four insert arms 120, or more than four insert arms 120. Similarly, receptor component 150 may include two receptor units 160, three receptor units 160, four receptor units 160, or more than four receptor units 160.

As a more specific example, in some embodiments of payload engagement system 100, insert component 110 includes three insert arms 120 and receptor component 150 includes three receptor units 160. Such a configuration may produce a more stable and/or secure engagement between insert component 110 and receptor component 150 relative to an otherwise identical payload engagement system 100 that includes fewer insert arms 120 and/or fewer receptor units 160. Such a configuration additionally may have a smaller weight and/or materials cost, and/or may permit a less strict manufacturing tolerance, relative to an otherwise identical payload engagement system 100 that includes more insert arms 120 and/or more receptor units 160. For example, an embodiment of payload engagement system 100 in which insert component 110 engages receptor component 150 at more than three points of contact (e.g., the points at which more than three insert arms 120 engage more than three respective receptor units 160) may require precise manufacturing tolerances to ensure that each insert arm 120 remains in contact with a respective receptor unit 160 while vehicle 10 carries payload 50. By contrast, an embodiment of payload engagement system 100 in which insert component 110 engages receptor component 150 at three points of contact (e.g., the points at which three insert arms 120 engage three respective receptor units 160) may facilitate consistent contact between each insert arm 120 and each corresponding receptor unit 160 independent of slight variations in the positions of insert arms 120 and/or receptor units 160 relative to a manufacturing specification.

In the examples of payload engagement system 100 illustrated in FIGS. 1-2 and 9-11, the number of insert arms 120 is equal to the number of receptor units 160. However, this is not required to all examples of payload engagement system 100 according to the present disclosure, and it is additionally within the scope of the present disclosure that payload engagement system 100 may include more insert arms 120 than receptor units 160 or fewer insert arms 120 than receptor units 160.

Each receptor unit 160 may be configured to be coupled to and/or mounted to payload 50 in any appropriate manner. For example, and as schematically illustrated in FIGS. 1-2, each receptor unit 160 may be configured to be mounted on an upper surface 52 of payload 50, such as a generally planar upper surface 52. In some examples of payload engagement system 100 that include insert arms 120 and receptor units 160, each insert arm 120 is removed from a corresponding receptor unit 160 when payload engagement system 100 is in the disengaged configuration, and is received within the corresponding receptor unit 160 when payload engagement system 100 is in the engaged configuration.

Payload engagement system 100 may be configured to transition between the disengaged configuration and the engaged configuration upon axial and/or vertical alignment of insert component 110 and receptor component 150. For example, and as schematically illustrated in FIGS. 1-2, in some embodiments of payload engagement system 100, insert arms 120 are distributed about, and/or extend radially from, insert component central axis 112 of insert component 110, and receptor units 160 are distributed about receptor component central axis 152 of receptor component 150. In some examples of such an embodiment, insert component central axis 112 and receptor component central axis 152 are at least substantially parallel and/or at least substantially collinear when payload engagement system 100 transitions between the disengaged configuration and the engaged configuration. As another example, and as schematically illustrated in FIGS. 1-2, in some embodiments of payload engagement system 100, each insert arm 120 extends within an insert component plane 114 of insert component 110, and each receptor unit 160 is positioned within a receptor component plane 154 of receptor component 150. In some examples of such an embodiment, insert component plane 114 and receptor component plane 154 are at least substantially parallel and/or at least substantially coplanar when payload engagement system 100 transitions between the disengaged configuration and the engaged configuration.

Figure 3:
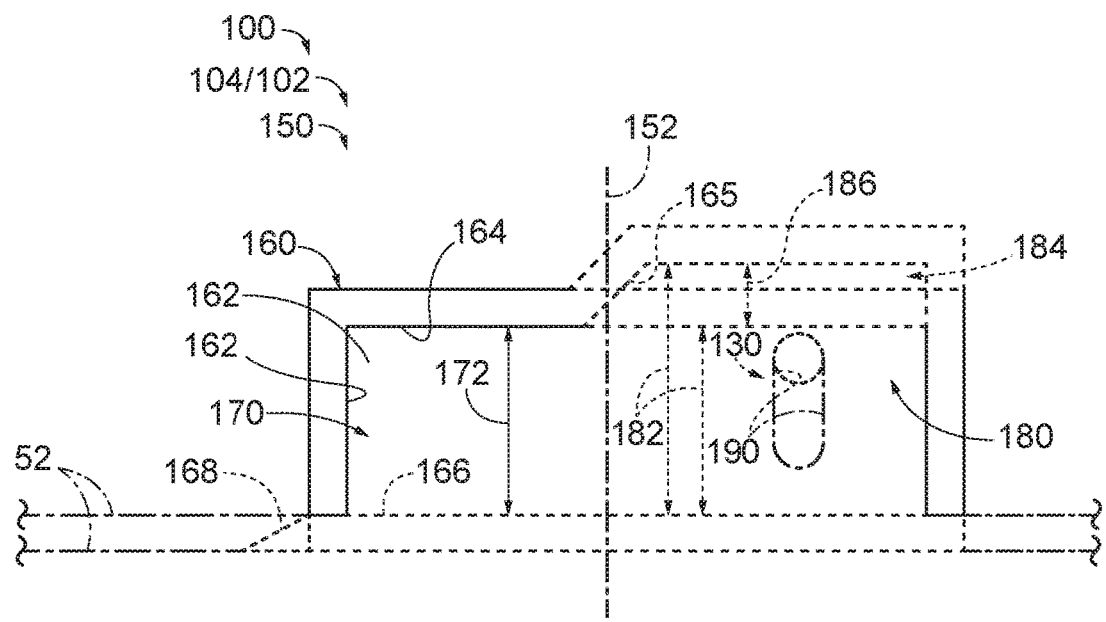
FIG. 3 is a schematic front elevation view representing examples of receptor units according to the present disclosure.
Figure 4:
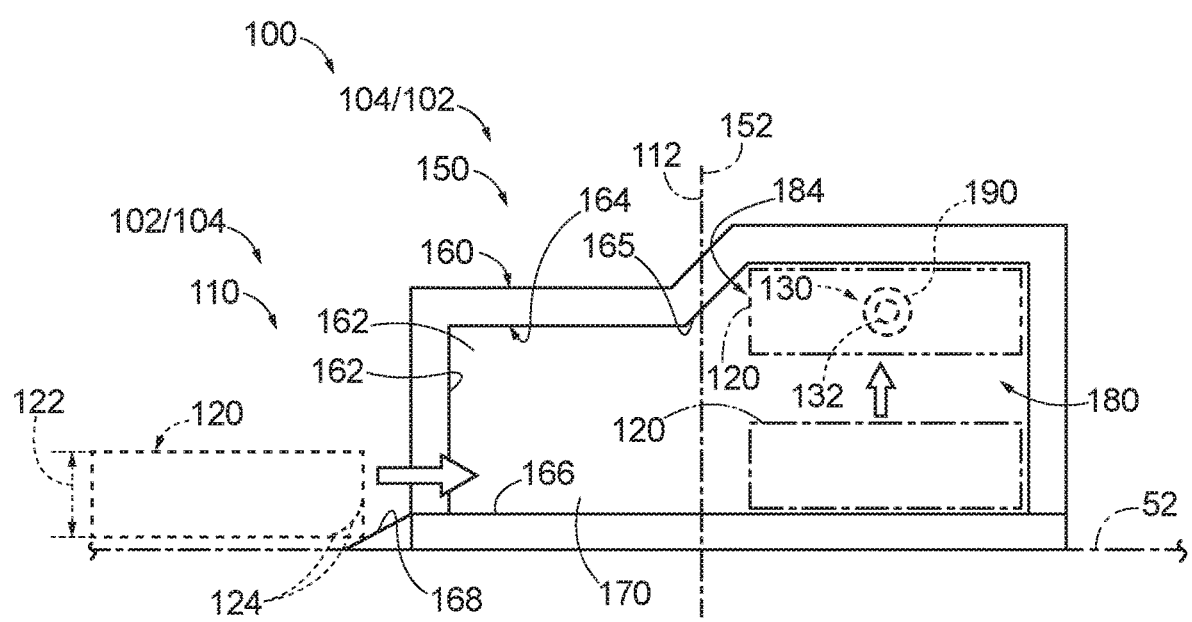
FIG. 4 is a schematic front elevation view representing an insert arm transitioning from a disengaged configuration to an engaged configuration within a receptor unit according to the present disclosure.

FIG. 3 schematically illustrates examples of receptor units 160, and FIG. 4 schematically illustrates an example of a spatial relationship between receptor unit 160 and insert arm 120 while payload engagement system 100 is transitioned from the disengaged configuration to the engaged configuration. As schematically illustrated in FIGS. 3-4, receptor unit 160 generally includes and/or is at least partially defined by at least one side wall 162 and at least one upper wall 164. Receptor unit 160 additionally may include a receptor base 166 that extends from upper surface 52 of payload 50 when receptor unit 160 is mounted on payload 50. In such an embodiment, receptor unit 160 may be mounted to payload 50 via receptor base 166, such as by affixing, adhering, and/or mechanically connecting receptor base 166 to upper surface 52. However, this is not required to all examples of payload engagement system 100 according to the present disclosure, and it is additionally within the scope of the present disclosure that receptor unit 160 may lack receptor base 166, and or may be mounted to payload 50 via at least one side wall 162.

In some examples of an embodiment of receptor unit 160 that includes receptor base 166, and as schematically illustrated in FIGS. 3-4, receptor unit 160 additionally includes a ramp portion 168 that extends between upper surface 52 of payload 50 and receptor base 166 when receptor unit 160 is mounted on payload 50. More specifically, when present, ramp portion 168 extends oblique to upper surface 52, such as to facilitate insert arm 120 entering receptor unit 160 when payload engagement system 100 transitions from the disengaged configuration to the engaged configuration. As a more specific example, and as schematically illustrated in FIG. 4, insert arm 120 may include an insert arm base 124 such that ramp portion 168 is configured to engage insert arm base 124 to at least partially guide insert arm 120 into receptor unit 160 when payload engagement system 100 is transitioned from the disengaged configuration to the engaged configuration. As a more specific example, and as additionally schematically illustrated in FIG. 4, insert arm base 124 may be at least partially rounded, such as to facilitate insert arm base 124 entering and/or exiting receptor unit 160 via contact with ramp portion 168.

Receptor unit 160 may have any appropriate form and/or structure for receiving insert arm 120. For example, and as schematically illustrated in FIGS. 3-4, some examples of receptor unit 160 include and/or define an antechamber 170 and a locking chamber 180. In such an embodiment, and as schematically illustrated in FIG. 3, antechamber 170 may be characterized by an antechamber height 172, and locking chamber 180 may be characterized by a locking chamber height 182 that is greater than antechamber height 172. In some examples of such an embodiment, upper wall 164 of receptor unit 160 includes a transition region 165 between antechamber 170 and locking chamber 180, such that upper wall 164 is ramped and/or smoothly curved within transition region 165.

Antechamber height 172 and/or locking chamber height 182 may be measured in any appropriate manner. For example, in an embodiment in which receptor unit 160 includes receptor base 166, antechamber height 172 may be measured between receptor base 166 and upper wall 164 in antechamber 170 and in a direction parallel to receptor component central axis 152. Similarly, in such an embodiment, locking chamber height 182 may be measured between receptor base 166 and upper wall 164 in locking chamber 180 and in the direction parallel to receptor component central axis 152. Alternatively, in an embodiment in which receptor unit 160 lacks receptor base 166, antechamber height 172 may be measured between upper surface 52 of payload 50 and upper wall 164 in antechamber 170 and in the direction parallel to receptor component central axis 152 when receptor unit 160 is mounted to upper surface 52. Similarly, in such an embodiment, locking chamber height 182 may be measured between upper surface 52 of payload 50 and upper wall 164 in locking chamber 180 and in the direction parallel to receptor component central axis 152 when receptor unit 160 is mounted to upper surface 52.

Antechamber height 172 and locking chamber height 182 may be any appropriate respective heights, such as relative to a dimension of insert arm 120. For example, and as schematically illustrated in FIG. 4, insert arm 120 may have and/or be characterized by an insert arm height 122, as measured in a direction parallel to insert component central axis 112, and antechamber height 172 and/or locking chamber height 182 each may be at least 100% of insert arm height 122, at least 120% of insert arm height 122, at least 140% of insert arm height 122, at least 160% of insert arm height 122, at least 180% of insert arm height 122, at most 200% of insert arm height 122, at most 170% of insert arm height 122, at most 150% of insert arm height 122, at most 130% of insert arm height 122, and/or at most 110% of insert arm height 122.

In an embodiment of receptor unit 160 that includes antechamber 170 and locking chamber 180, and as schematically illustrated in FIG. 4, receptor unit 160 generally is configured such that insert arm 120 passes through antechamber 170 when payload engagement system 100 is transitioned between the disengaged configuration and the engaged configuration. As examples, in such an embodiment, insert arm 120 passes through antechamber 170 and subsequently enters locking chamber 180 when payload engagement system 100 transitions from the disengaged configuration to the engaged configuration, and insert arm 120 passes through antechamber 170 and subsequently exits receptor unit 160 when payload engagement system transitions from the engaged configuration to the disengaged configuration.

In an embodiment of receptor unit 160 that includes antechamber 170 and locking chamber 180, locking chamber 180 generally is configured such that a corresponding insert arm 120 is received in locking chamber 180 when payload engagement system 100 is in the engaged configuration. More specifically, and as schematically illustrated in FIG. 4, in an embodiment in which locking chamber height 182 is greater than antechamber height 172, locking chamber 180 may be described as including a locking chamber recess 184 configured to at least partially receive insert arm 120 when payload engagement system 100 is in the engaged configuration. Locking chamber recess 184 may be at least partially defined by side wall 162, upper wall 164, and/or transition region 165. In such an embodiment, locking chamber 180 and/or locking chamber recess 184 at least partially restricts insert arm 120 from moving within locking chamber 180 and/or rotating (such as about insert component central axis 112) when payload engagement system 100 is in the engaged configuration. More specifically, when payload engagement system 100 is in the engaged configuration, insert arm 120 is at least partially restricted from moving within locking chamber 180 by locking chamber recess 184, side wall 162, upper wall 164, and/or transition region 165. In this manner, locking chamber 180 and/or locking chamber recess 184 may facilitate maintaining payload engagement system 100 in the engaged configuration while vehicle 10 carries payload 50.

Locking chamber recess 184 may have any appropriate dimension, such as to securely receive insert arm 120 and/or to securely restrict motion of insert arm 120. For example, and as schematically illustrated in FIG. 3, locking chamber recess 184 may have and/or be characterized by a recess depth 186 that is at least 10% of locking chamber height 182, at least 20% of locking chamber height 182, at least 30% of locking chamber height 182, at least 40% of locking chamber height 182, at least 50% of locking chamber height 182, at most 55% of locking chamber height 182, at most 45% of locking chamber height 182, at most 35% of locking chamber height 182, at most 25% of locking chamber height 182, and/or at most 15% of locking chamber height 182. Additionally or alternatively, recess depth 186 may describe and/or correspond to a difference between locking chamber height 182 and antechamber height 172.

When payload engagement system 100 is in the engaged configuration, insert arm 120 may be restricted from exiting locking chamber 180 in any appropriate manner. As an example, as vehicle 10 carries payload 50, a force of gravity may at least partially retain insert arm 120 within locking chamber recess 184 by restricting insert arm 120 from translating vertically downward with respect to locking chamber recess 184, as may be required for insert arm 120 to exit locking chamber 180 (and hence receptor unit 160). Additionally or alternatively, and as schematically illustrated in FIGS. 1-2 and 4-6, insert component 110 may include a securement mechanism 130 configured to at least partially restrict payload engagement system 100 from transitioning from the engaged configuration to the disengaged configuration. More specifically, when present, securement mechanism 130 includes a securement engager 132 and a securement receiver 190 configured to selectively receive securement engager 132 to at least partially restrict payload engagement system 100 from transitioning from the engaged configuration to the disengaged configuration. When present, securement mechanism 130 is configured to be selectively transitioned between an unlocked configuration and a locked configuration. Specifically, in the unlocked configuration, securement mechanism 130 does not restrict payload engagement system 100 from transitioning from the engaged configuration to the disengaged configuration, whereas in the locked configuration, securement mechanism 130 at least partially restricts payload engagement system 100 from transitioning from the engaged configuration to the disengaged configuration.

Securement mechanism 130 may be incorporated into payload engagement system 100 in any appropriate manner. For example, in some examples of payload engagement system 100, insert component 110 includes securement engager 132, and receptor component 150 includes securement receiver 190. More specifically, at least one insert arm 120 may include securement engager 132, and at least one corresponding receptor unit 160 may include securement receiver 190. For example, securement receiver 190 may be defined by side wall 162, upper wall 164, and/or receptor base 166 of receptor unit 160. In such an embodiment, securement receiver 190 receives securement engager 132 to at least partially restrict payload engagement system 100 from transitioning from the engaged configuration to the disengaged configuration.

Securement mechanism 130, securement engager 132, and/or securement receiver 190 may have any appropriate structure. As examples, securement engager 132 may include and/or be a pin, a bolt, a latch, a hook, and/or a clasp. As additional examples, securement receiver 190 may include and/or be a hole, a circular hole, a slot, a vertical slot, an aperture, a bar, and/or a ledge. Securement receiver 190 may be configured to receive securement engager 132 in any appropriate manner. For example, securement engager 132 may extend through securement receiver 190 and/or may engage securement receiver 190 when securement mechanism 130 is in the locked configuration.

FIG. 3 schematically illustrates examples of securement receiver 190 in the form of a circular hole (dashed lines in FIG. 3) and a vertical slot (dash-dot lines in FIG. 3), while FIG. 4 schematically illustrates an example of securement receiver 190 in the form of a circular hole. In an embodiment of securement mechanism 130 in which securement receiver 190 takes the form of a hole, and as schematically illustrated in FIG. 4, securement mechanism 130 may be configured to transition between the unlocked configuration and the locked configuration only when insert arm 120 is received within locking chamber recess 184. Alternatively, in an embodiment of securement mechanism 130 in which securement receiver 190 takes the form of a vertical slot, securement receiver 190 may permit securement engager 132 to translate vertically within securement receiver 190. Such an embodiment may permit securement mechanism 130 to be transitioned between the unlocked configuration and the locked configuration when insert arm 120 is in locking chamber 180, regardless of whether insert arm 120 is in locking chamber recess 184.

Figure 5:
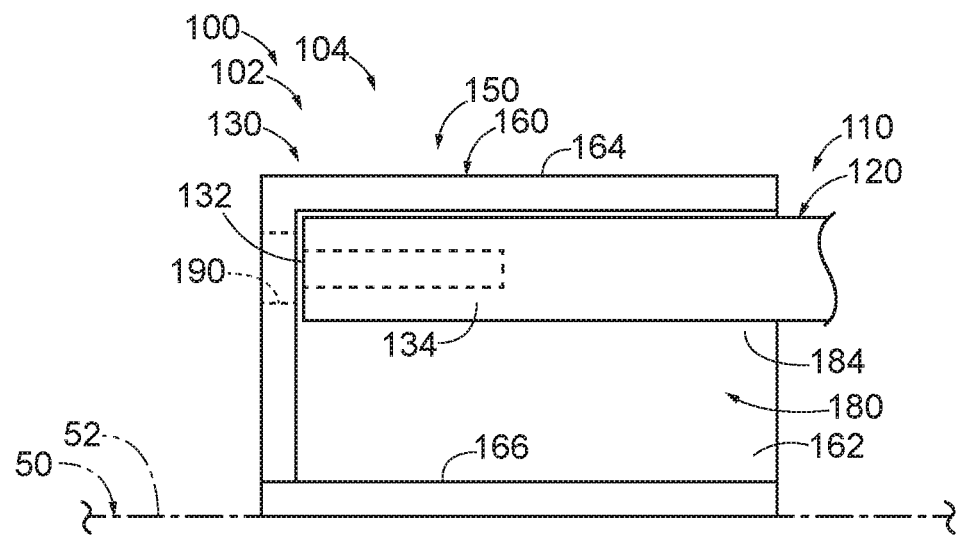
FIG. 5 is a schematic side elevation view representing an insert arm received within a receptor unit and with a securement mechanism in an unlocked configuration according to the present disclosure.
Figure 6:
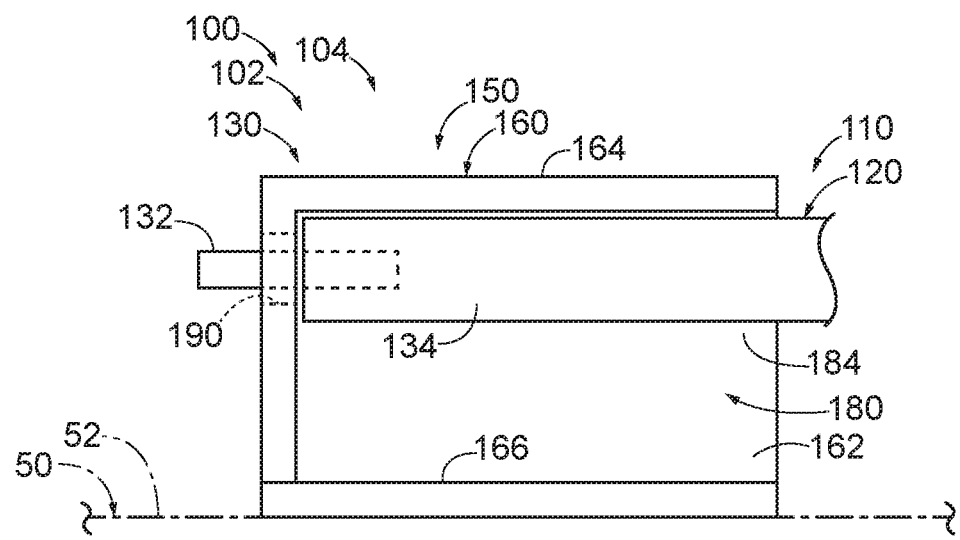
FIG. 6 is a schematic side elevation view representing the insert arm and receptor unit of FIG. 5 with the securement mechanism in a locked configuration according to the present disclosure.

FIG. 5 schematically illustrates an example of a portion of payload engagement system 100 with securement mechanism 130 in the unlocked configuration, and FIG. 6 schematically illustrates the portion of payload engagement system 100 of FIG. 5 with securement mechanism 130 in the locked configuration. In the example of FIGS. 5-6, securement engager 132 takes the form of a pin and securement receiver 190 takes the form of a hole such that securement engager 132 extends through securement receiver 190 when securement mechanism 130 is in the locked configuration. As schematically illustrated in FIGS. 5-6, securement engager 132 may be described as being in an extended position when securement mechanism 130 is in the locked configuration (FIG. 6), and may be described as being in a retracted position when securement mechanism 130 is in the unlocked configuration (FIG. 5). Securement engager 132 may be biased toward the extended position, may be biased toward the retracted position, or may not be biased toward either of the extended position and the retracted position.

As further schematically illustrated in FIGS. 5-6, securement mechanism 130 additionally may include a securement mechanism actuator 134 configured to transition each securement engager 132 between the extended position and the retracted position. When present, securement mechanism actuator 134 is configured to transition a corresponding securement engager 132 between the extended position and the retracted position. For example, in an embodiment of securement mechanism 130 that includes more than one securement engager 132, each securement engager 132 may be transitioned between the extended position and the retracted position by a unique corresponding securement mechanism actuator 134. Alternatively, in an embodiment of securement mechanism 130 that includes more than one securement engagers 132, securement mechanism actuator 134 may be configured to transition each of a plurality of corresponding securement engagers 132 between the extended position and the retracted position. Securement mechanism actuator 134 may include and/or be any appropriate mechanism for selectively transitioning securement engager 132 between the extended position and the retracted position. As examples, securement mechanism actuator 134 may include and/or be a motor, a servomotor, a screw drive motor, a pneumatic actuator, and/or a hydraulic actuator.

Figure 7:
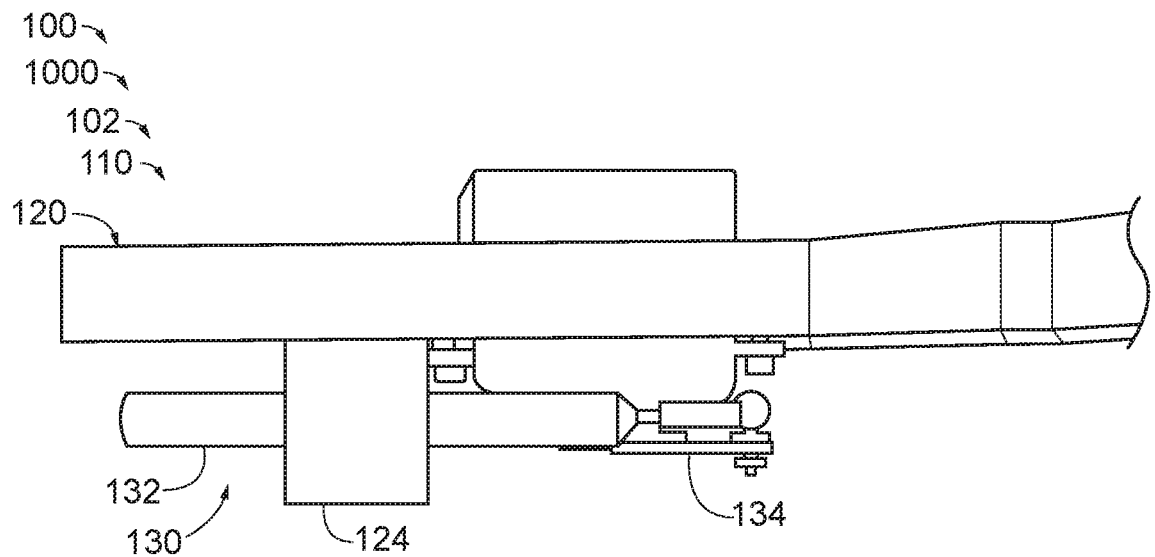
FIG. 7 is a side elevation view representing an insert arm with a securement engager in a retracted position according to the present disclosure.
Figure 8:
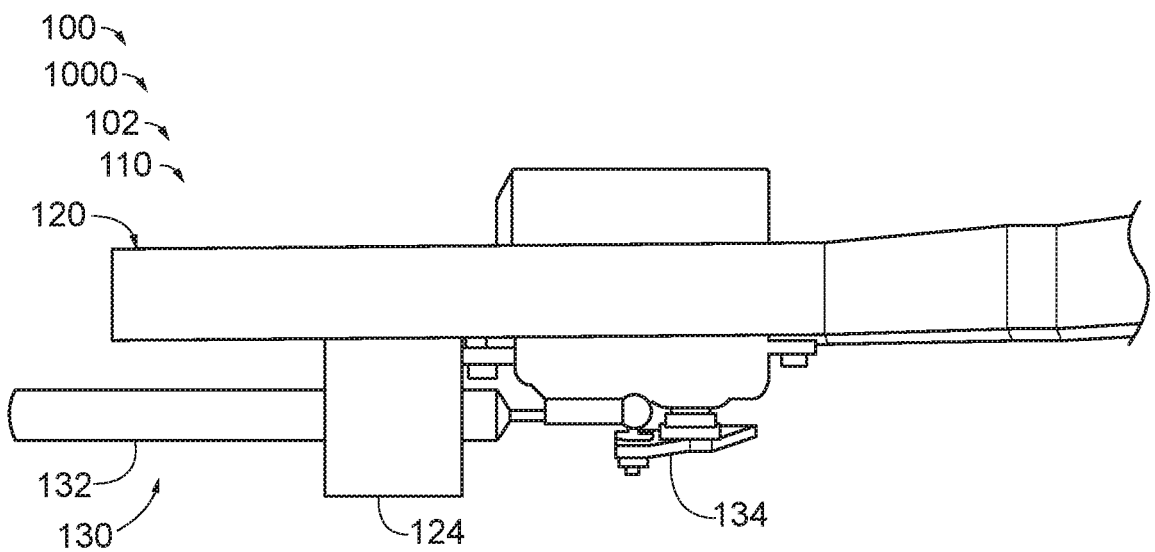
FIG. 8 is a side elevation view representing the insert arm of FIG. 7 with the securement engager in an extended position according to the present disclosure.

FIGS. 7-11 illustrate portions of a payload engagement system 1000, which is an example of payload engagement system 100 according to the present disclosure. Specifically, in the example of FIGS. 7-11, vehicle supported portion 102 of payload engagement system 1000 includes insert component 110, and payload mounted portion 104 of payload engagement system 1000 includes receptor component 150. As seen in FIGS. 7-8, payload engagement system 1000 includes securement mechanism 130 with securement engager 132 in the form of a pin. Specifically, FIG. 7 illustrates securement engager 132 in the retracted position, and FIG. 8 illustrates securement engager 132 in the extended position.

Figure 9:
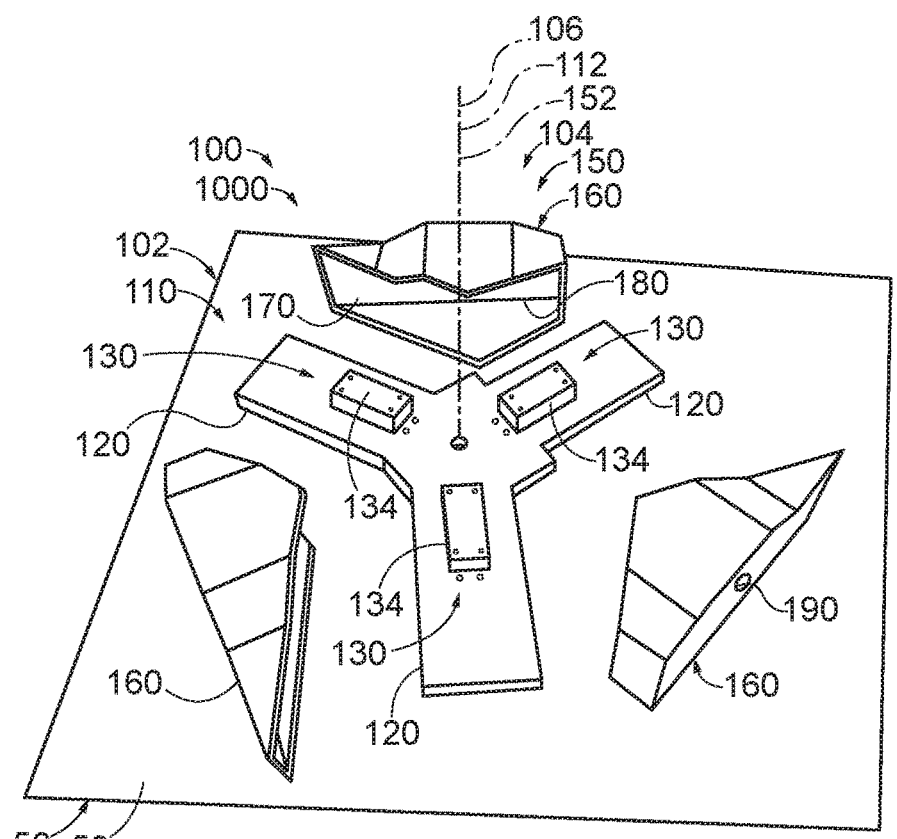
FIG. 9 is a top perspective view representing a payload engagement system in a disengaged configuration according to the present disclosure.
Figure 10:
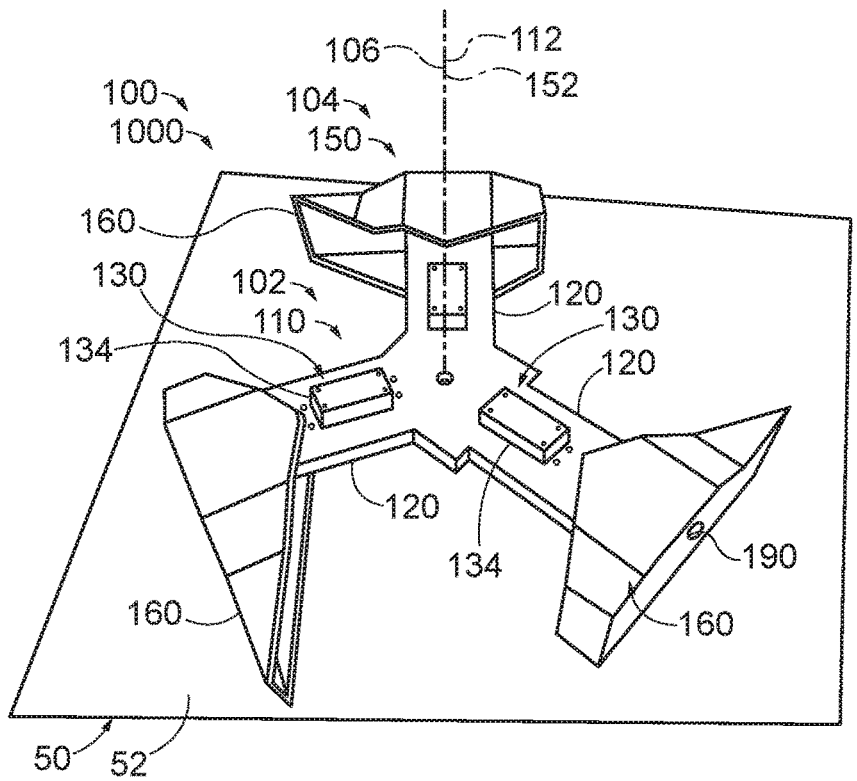
FIG. 10 is a top perspective view representing the payload engagement system of FIG. 9 in an engaged configuration according to the present disclosure.
Figure 11:
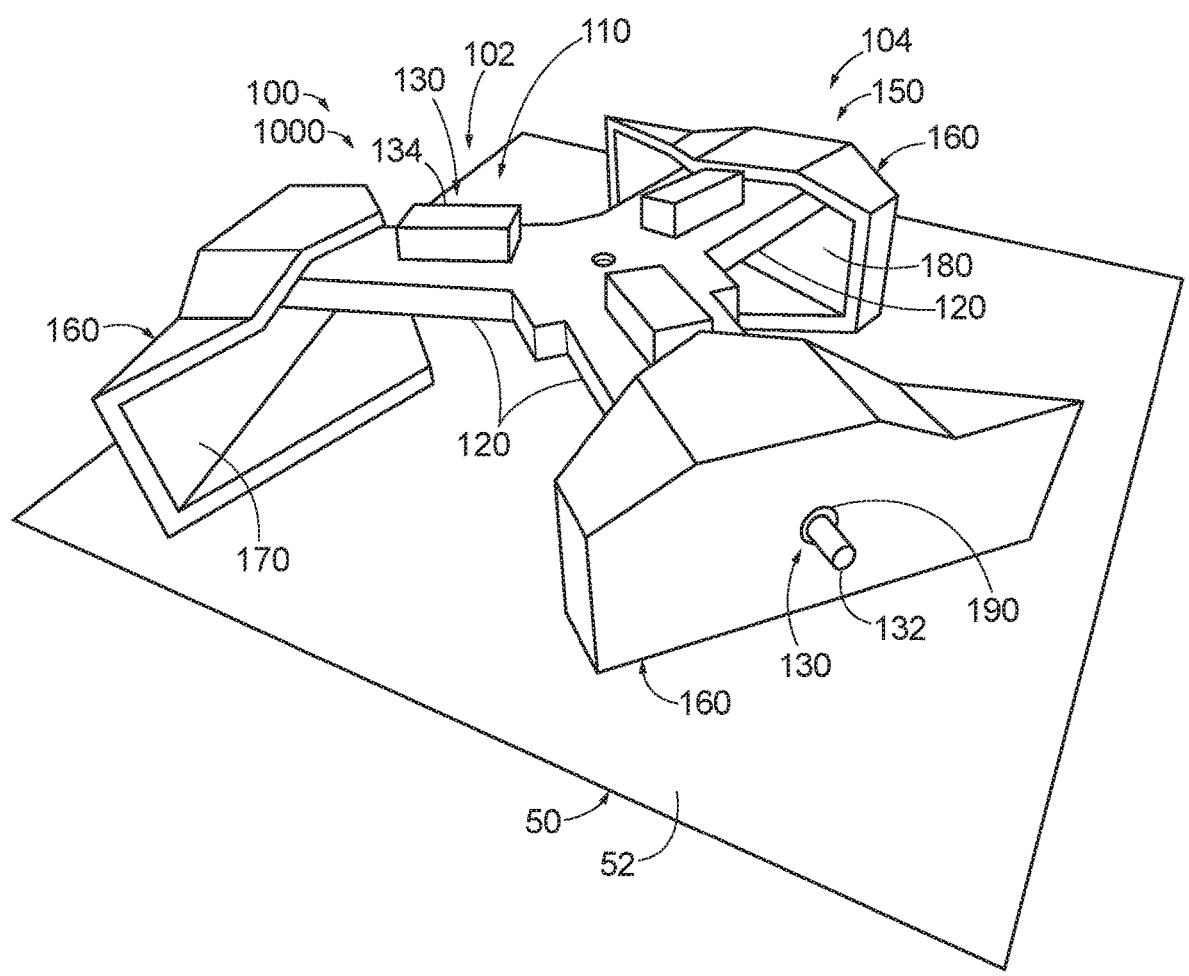
FIG. 11 is a side perspective view representing a payload engagement system in the locked configuration and with a securement mechanism in a locked configuration according to the present disclosure.

As seen in FIGS. 9-11, payload engagement system 1000 includes three insert arms 120 and three receptor units 160. Specifically, FIG. 9 illustrates payload engagement system 1000 in the disengaged configuration, while FIGS. 10-11 illustrate payload engagement system 1000 in the engaged configuration. More specifically, FIG. 10 illustrates payload engagement system 1000 in the engaged configuration and with securement mechanism 130 in the unlocked configuration, while FIG. 11 illustrates payload engagement system 1000 in the engaged configuration and with securement mechanism 130 in the locked configuration.

Figure 12:
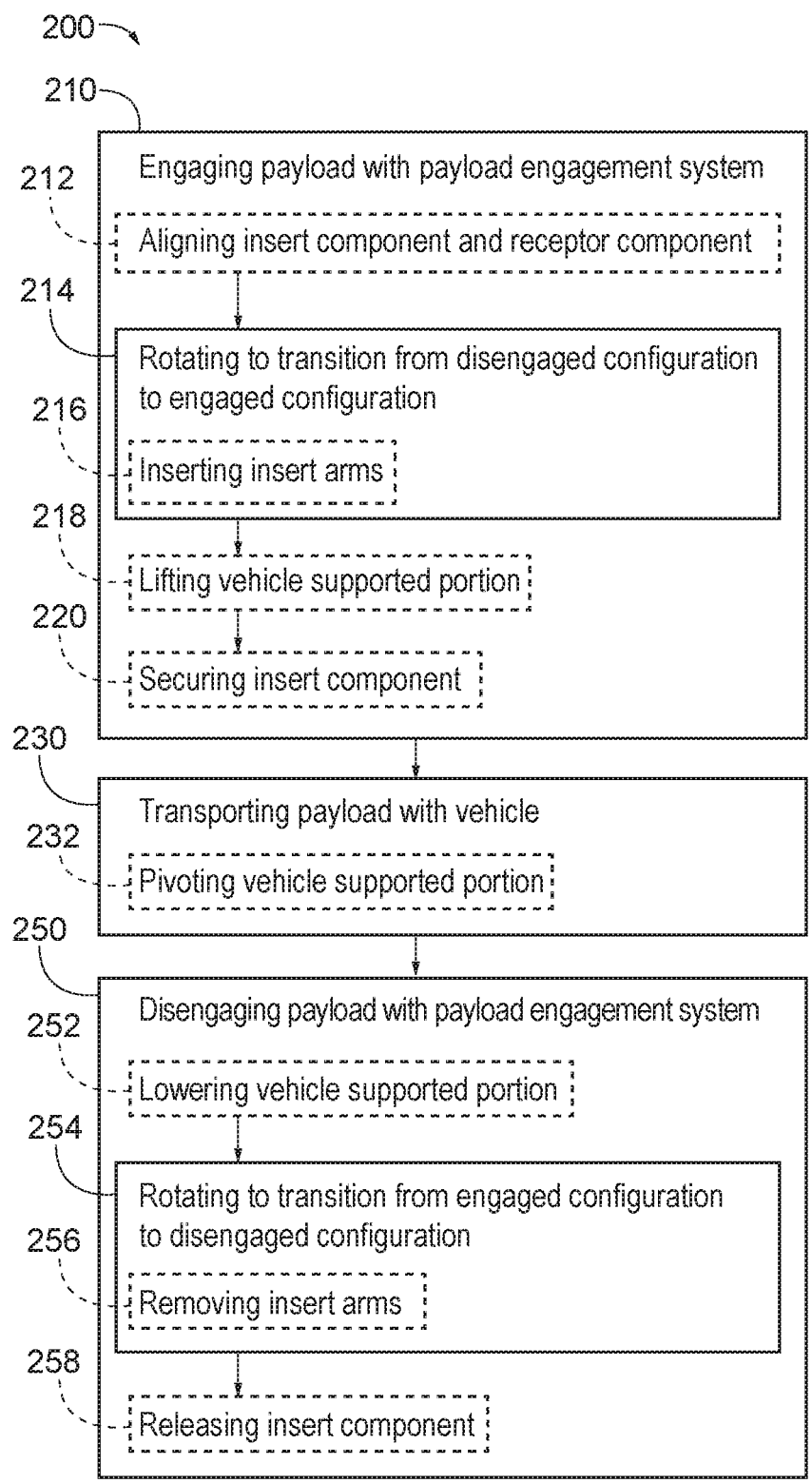
FIG. 12 is a flowchart depicting methods of transporting a payload with a vehicle according to the present disclosure.

FIG. 12 is a flowchart depicting methods 200, according to the present disclosure, of transporting a payload with a vehicle. As shown in FIG. 12, a method 200 includes engaging, at 210, a payload (such as payload 50) with a payload engagement system (such as payload engagement system 100); transporting, at 230, the payload with a vehicle (such as vehicle 10); and disengaging, at 250, the payload with the payload engagement system. Specifically, a method 200 includes utilizing a payload engagement system that includes a vehicle supported portion (such as vehicle supported portion 102) that is supported by the vehicle and a payload mounted portion (such as payload mounted portion 104) that is mounted to the payload. More specifically, one of the vehicle supported portion and the payload mounted portion includes and/or is an insert component (such as insert component 110), and the other of the vehicle supported portion and the payload mounted portion includes and/or is a receptor component (such as receptor component 150) such that the insert component is selectively received within the receptor component.

The engaging at 210 includes rotating, at 214, the vehicle supported portion with respect to the payload mounted portion to transition the payload engagement system from a disengaged configuration to an engaged configuration. Similarly, the disengaging at 250 includes rotating, at 254, the vehicle supported portion with respect to the payload mounted portion to transition the payload engagement system from the engaged configuration to the disengaged configuration. The rotating at 214 and the rotating at 254 may be performed in any appropriate manner. For example, the rotating at 214 and/or the rotating at 254 may include rotating the vehicle with respect to the payload to rotate the insert component with respect to the receptor component. Additionally or alternatively, the vehicle supported portion may be coupled to the vehicle via a rotary element (such as rotary element 24), and the rotating at 214 and/or the rotating at 254 may include rotating the vehicle supported portion with respect to the vehicle with the rotary element to rotate the insert component with respect to the receptor component. In such an embodiment, the rotating at 214 and/or the rotating at 254 may not include rotating the vehicle with respect to the payload mounted portion.

Methods 200 may be performed with and/or utilize a payload engagement system in which the insert component includes at least two insert arms (such as insert arms 120) and the receptor component includes at least two receptor units (such as receptor units 160). More specifically, each receptor unit may include an antechamber (such as antechamber 170) and a locking chamber (such as locking chamber 180). In such an embodiment, and as indicated in FIG. 12, the rotating at 214 may include inserting, at 216, each insert arm into the locking chamber of a respective receptor unit via the antechamber of the respective receptor unit. Similarly, in such an embodiment, and as further indicated in FIG. 12, the rotating at 254 may include removing, at 256, each insert arm from the locking chamber of the respective receptor unit via the antechamber of the respective receptor unit.

As indicated in FIG. 12, the engaging at 210 may include aligning, at 212, the insert component and the receptor component, such as prior to the rotating at 214. The aligning at 212 may include aligning along any appropriate dimension, such as vertically aligning and/or axially aligning. For example, the aligning at 212 may include aligning such that an insert component central axis (such as insert component central axis 112) and a receptor component central axis (such a receptor component central axis 152) are at least substantially parallel and/or collinear. Additionally or alternatively, the aligning at 212 may include aligning such that an insert component plane (such as insert component plane 114) and a receptor component plane (such as receptor component plane 154) are at least substantially parallel and/or coplanar.

As additionally indicated in FIG. 12, the engaging at 210 may include, subsequent to the rotating at 214, lifting, at 218, the vehicle supported portion with respect to the payload mounted portion such that each insert arm is at least partially received in a locking chamber recess (such as locking chamber recess 184) of the locking chamber of the respective receptor unit. The lifting at 218 may include lifting such that each insert arm is rotationally constrained within each respective locking chamber. Additionally or alternatively, the lifting at 218 may include lifting such that each insert arm contacts an upper wall (such as upper wall 164) of the respective receptor unit.

As further indicated in FIG. 12, the engaging at 210 additionally may include securing, at 220, the insert component in the engaged configuration via at least one securement mechanism (such as securement mechanism 130). The securing at 220 may include transitioning each securement mechanism from an unlocked configuration to a locked configuration, such as to at least partially restrict the payload engagement system from transitioning to the disengaged configuration. The lifting at 218 and the securing at 220 may be performed in any appropriate sequence. As examples, the securing at 220 may be performed prior to the lifting at 218, or may be performed subsequent to the lifting at 218.

The transporting at 230 may be performed in any appropriate manner. For example, the transporting at 230 may include transporting such that the receptor component central axis remains at least substantially parallel to a vertical axis (such as vertical axis 106). As a more specific example, and as indicated in FIG. 12, the transporting at 230 may include pivoting, at 232, the vehicle supported portion with respect to the vehicle with a gimbal (such as gimbal 22), such as to maintain the receptor component central axis in an orientation that is at least substantially parallel to the vertical axis. As a more specific example, in an embodiment in which the vehicle includes and/or is an aircraft (such as aircraft 11), such as a rotorcraft and/or a UAV, the aircraft may tilt relative to a ground surface toward a direction in which the aircraft travels. In such an embodiment, the pivoting at 232 may include pivoting the vehicle supported portion with respect to the aircraft such that the payload remains at least substantially upright as the aircraft tilts with respect to the ground surface.

The disengaging at 250 may be performed in any appropriate manner. For example, and with continued reference to FIG. 12, the disengaging at 250 may include, prior to the rotating at 254, lowering, at 252, the vehicle supported portion with respect to the payload mounted portion. Specifically, the lowering at 252, when performed, includes lowering such that each insert arm is removed from the locking chamber recess of the respective receptor unit, such as to permit the insert arm to rotate with respect to the receptor unit. The lowering at 252 may include lowering such that each insert arm contacts a receptor base (such as receptor base 166) of the respective receptor unit.

As further indicated in FIG. 12, in an embodiment in which the insert component includes at least one securement mechanism, the disengaging at 250 additionally may include releasing, at 258, the insert component by transitioning each securement mechanism from the locked configuration to the unlocked configuration. The releasing at 258 may include releasing such that the securement mechanism ceases to restrict the payload engagement system from transitioning to the disengaged configuration. The lowering at 252 and the releasing at 258 may be performed in any appropriate sequence. As examples, the releasing at 258 may be performed prior to the lowering at 252, or may be performed subsequent to the lowering at 252.

Illustrative, non-exclusive examples of inventive subject matter according to the present disclosure are described in the following enumerated paragraphs:

A. A payload engagement system for selectively coupling a payload to a vehicle, the payload engagement system comprising:

a vehicle supported portion configured to be supported by the vehicle; and a payload mounted portion configured to be mounted on the payload;

wherein one of the vehicle supported portion and the payload mounted portion includes an insert component; wherein the other of the vehicle supported portion and the payload mounted portion includes a receptor component; wherein the payload engagement system is configured to transition between a disengaged configuration and an engaged configuration at least partially via rotation of the insert component with respect to the receptor component; and wherein, in the engaged configuration, the receptor component receives the insert component and engages the insert component such that the insert component is rotationally constrained within the receptor component to enable the vehicle to carry the payload.

A1.1. The payload engagement system of paragraph A, wherein the insert component is configured to rotate with respect to the receptor component about at least one of an insert component central axis of the insert component, a receptor component central axis of the receptor component, and a vertical axis, when the payload engagement system transitions between the disengaged configuration and the engaged configuration.

A1.2. The payload engagement system of any of paragraphs A-A1.1, wherein the vehicle supported portion includes the insert component and the payload mounted portion includes the receptor component.

A1.3. The payload engagement system of any of paragraphs A-A1.1, wherein the vehicle supported portion includes the receptor component and the payload mounted portion includes the insert component.

A1.4. The payload engagement system of any of paragraphs A-A1.3, wherein the payload engagement system is configured to transition between the disengaged configuration and the engaged configuration via translation of the insert component with respect to the receptor component along a/the vertical axis.

A1.5. The payload engagement system of paragraph A1.4, wherein the payload engagement system is configured to transition from the disengaged configuration to the engaged configuration via upward translation of the vehicle supported portion with respect to the payload mounted portion along the vertical axis subsequent to rotation of the insert component with respect to the receptor component, and wherein the payload engagement system is configured to transition from the engaged configuration to the disengaged configuration via downward translation of the vehicle supported portion with respect to the payload mounted portion along the vertical axis prior to rotation of the insert component with respect to the receptor component.

A1.6. The payload engagement system of paragraph A1.5, wherein the upward translation of the vehicle supported portion with respect to the payload mounted portion causes the insert component to be rotationally constrained within the receptor component.

A1.7. The payload engagement system of any of paragraphs A1.5-A1.6, wherein the downward translation of the vehicle supported portion with respect to the payload mounted portion causes the insert component to be free to rotate with respect to the receptor component.

A2.1. The payload engagement system of any of paragraphs A-A1.7, wherein the insert component includes at least two insert arms.

A2.2. The payload engagement system of paragraph A2.1, wherein the at least two insert arms consists of one of two insert arms, three insert arms, four insert arms, and more than four insert arms.

A2.3. The payload engagement system of any of paragraphs A2.1-A2.2, wherein the receptor component includes at least two receptor units corresponding to the at least two insert arms.

A2.4. The payload engagement system of paragraph A2.3, wherein the at least two receptor units consists of one of two receptor units, three receptor units, four receptor units, and more than four receptor units.

A2.5. The payload engagement system of any of paragraphs A2.3-A2.4, wherein each insert arm is removed from a corresponding receptor unit when the payload engagement system is in the disengaged configuration, and wherein each insert arm is received within the corresponding receptor unit when the payload engagement system is in the engaged configuration.

A3.1. The payload engagement system of any of paragraphs A2.3-A2.5, wherein the at least two insert arms are distributed about a/the insert component central axis of the insert component; wherein the at least two receptor units are distributed about a/the receptor component central axis of the receptor component, and wherein the insert component central axis and the receptor component central axis are at least substantially parallel when the payload engagement system transitions between the disengaged configuration and the engaged configuration.

A3.2. The payload engagement system of paragraph A3.1, wherein the insert component central axis and the receptor component central axis are at least substantially collinear when the payload engagement system transitions between the disengaged configuration and the engaged configuration.

A3.3. The payload engagement system of any of paragraphs A3.1-A3.2, wherein each insert arm extends radially from the insert component central axis.

A3.4. The payload engagement system of any of paragraphs A2.3-A3.3, wherein each of the at least two insert arms extends within an insert component plane of the insert component; wherein each of the at least two receptor units is positioned within a receptor component plane of the receptor component, and wherein the insert component plane and the receptor component plane are at least substantially parallel when the payload engagement system transitions between the disengaged configuration and the engaged configuration.

A3.5. The payload engagement system of paragraph A3.4, wherein the insert component plane and the receptor component plane are at least substantially coplanar with the payload engagement system transitions between the disengaged configuration and the engaged configuration.

A3.6. The payload engagement system of any of paragraphs A-A3.5, wherein, in the engaged configuration, the insert component engages the receptor component such that a weight of the payload is supported by the vehicle supported portion.

A3.7. The payload engagement system of paragraph A3.6, wherein the payload engagement system is configured to support a payload weight that is at least 10 Newtons (N), at least 30 N, at least 50 N, at least 100 N, at least 300 N, at least 500 N, at most 1000 N, at most 700 N, at most 200 N, at most 70 N, and at most 20 N while the vehicle carries the payload.

A4.1. The payload engagement system of any of paragraphs A2.3-A3.7, wherein each receptor unit is configured to be mounted on an upper surface of the payload, optionally a generally planar upper surface of the payload.

A4.2. The payload engagement system of any of paragraphs A2.3-A4.1, wherein each receptor unit includes at least one side wall and at least one upper wall.

A4.3. The payload engagement system of any of paragraphs A2.3-A4.2, wherein each receptor unit includes a receptor base that extends from a/the upper surface of the payload when the receptor unit is mounted on the payload.

A4.4. The payload engagement system of any of paragraphs A2.3-A4.3, wherein each receptor unit includes a ramp portion that extends between the upper surface of the payload and a/the receptor base and oblique to the upper surface when the receptor unit is mounted on the payload.

A4.5. The payload engagement system of paragraph A4.4, wherein each ramp portion is configured to facilitate a corresponding insert arm entering the receptor unit.

A4.6. The payload engagement system of any of paragraphs A4.4-A4.5, wherein the corresponding insert arm includes an insert arm base, and wherein the ramp portion is configured to engage the insert arm base to at least partially guide the insert arm into the receptor unit when the payload engagement system is transitioned from the disengaged configuration to the engaged configuration.

A4.7. The payload engagement system of paragraph A4.6, wherein the insert arm base is at least partially rounded to facilitate the insert arm base entering and exiting the receptor unit via contact with the ramp portion.

A4.8. The payload engagement system of any of paragraphs A2.3-A4.7, wherein each receptor unit includes an antechamber and a locking chamber; wherein the antechamber has an antechamber height; wherein the locking chamber has a locking chamber height; and wherein the locking chamber height is greater than the antechamber height.

A4.9. The payload engagement system of paragraph A4.8, wherein the antechamber height is measured between a/the receptor base and a/the upper wall in the antechamber and in a direction parallel to a/the receptor component central axis, and wherein the locking chamber height is measured between the receptor base and the upper wall in the locking chamber and in the direction parallel to the receptor component central axis.

A4.10. The payload engagement system of paragraph A4.8, wherein the antechamber height is measured between a/the upper surface of the payload and a/the upper wall in the antechamber and in a direction parallel to a/the receptor component central axis when the receptor unit is mounted on the upper surface of the payload, and wherein the locking chamber height is measured between the upper surface of the payload and the upper wall in the locking chamber and in the direction parallel to the receptor component central axis when the receptor unit is mounted on the upper surface of the payload.

A4.11. The payload engagement system of any of paragraphs A4.8-A4.10, wherein each insert arm has an insert arm height, as measured in a direction parallel to a/the insert component central axis, and wherein at least one of the antechamber height and the locking chamber height is at least one of at least 100% of the insert arm height, at least 120% of the insert arm height, at least 140% of the insert arm height, at least 160% of the insert arm height, at least 180% of the insert arm height, at most 200% of the insert arm height, at most 170% of the insert arm height, at most 150% of the insert arm height, at most 130% of the insert arm height, and at most 110% of the insert arm height.

A4.12. The payload engagement system of any of paragraphs A4.8-A4.11, when dependent from paragraph A4.2, wherein the upper wall includes a transition region between the antechamber and the locking chamber, and wherein the transition region is at least one of ramped and smoothly curved.

A4.13. The payload engagement system of any of paragraphs A4.8-A4.12, wherein the corresponding insert arm is received in the locking chamber when the payload engagement system is in the engaged configuration.

A4.14. The payload engagement system of paragraph A4.13, wherein the locking chamber includes a locking chamber recess configured to at least partially receive the corresponding insert arm when the payload engagement system is in the engaged configuration.

A4.15. The payload engagement system of paragraph A4.14, wherein the locking chamber recess is at least partially defined by at least one of a/the at least one side wall, a/the at least one upper wall, and a/the transition region.

A4.16. The payload engagement system of any of paragraphs A4.13-A4.15, wherein the corresponding insert arm passes through the antechamber when the payload engagement system is transitioned between the disengaged configuration and the engaged configuration.

A4.17. The payload engagement system of any of paragraphs A4.13-A4.16, wherein, when the payload engagement system is in the engaged configuration, the corresponding insert arm is at least partially restricted from moving within the locking chamber by at least one of:
  a/the locking chamber recess;
  a/the at least one side wall; and
  a/the transition region of the upper wall.

A4.18. The payload engagement system of any of paragraphs A4.8-A4.16, wherein the locking chamber height is greater than the antechamber height by a recess depth that is at least one of at least 10% of the locking chamber height, at least 20% of the locking chamber height, at least 30% of the locking chamber height, at least 40% of the locking chamber height, at least 50% of the locking chamber height, at most 55% of the locking chamber height, at most 45% of the locking chamber height, at most 35% of the locking chamber height, at most 25% of the locking chamber height, and at most 15% of the locking chamber height.

A5.1. The payload engagement system of any of paragraphs A-A4.18, wherein the payload engagement system further includes a securement mechanism, wherein the securement mechanism includes at least one securement engager and at least one securement receiver, and wherein each securement receiver of the at least one securement receiver is configured to selectively receive a corresponding securement engager of the at least one securement engager when the payload engagement system is in the engaged configuration to at least partially restrict the payload engagement system from transitioning from the engaged configuration to the disengaged configuration.

A5.2. The payload engagement system of paragraph A5.1, wherein the insert component includes the at least one securement engager, and wherein the receptor component includes the at least one securement receiver.

A5.3. The payload engagement system of paragraph A5.2, when dependent from paragraph A3.2, wherein at least one insert arm includes the at least one securement engager, and wherein a corresponding at least one receptor unit includes the at least one securement receiver.

A5.4. The payload engagement system of any of paragraphs A5.1-A5.3, wherein each securement engager includes at least one of a pin, a bolt, a latch, a hook, and a clasp.

A5.5. The payload engagement system of any of paragraphs A5.1-A5.4, wherein each securement receiver includes at least one of a hole, a circular hole, a slot, a vertical slot, an aperture, a bar, and a ledge.

A5.6. The payload engagement system of any of paragraphs A5.3-A5.5, wherein each securement receiver is defined by at least one of a/the receptor base of the receptor unit, a/the side wall of the receptor unit, and a/the upper wall of the receptor unit.

A5.7. The payload engagement system of any of paragraphs A5.1-A5.6, wherein the securement mechanism is configured to be selectively transitioned between an unlocked configuration, in which the securement mechanism does not restrict the payload engagement system from transitioning from the engaged configuration to the disengaged configuration, and a locked configuration, in which the securement mechanism at least partially restricts the payload engagement system from transitioning from the engaged configuration to the disengaged configuration.

A5.8. The payload engagement system of paragraphs A5.7, wherein the securement mechanism is configured to transition between the unlocked configuration and the locked configuration when a/the insert arm is in a/the locking chamber.

A5.9. The payload engagement system of paragraph A5.8, wherein the securement mechanism is configured to transition between the unlocked configuration and the locked configuration only when the insert arm is received within a/the locking chamber recess of the locking chamber.

A5.10. The payload engagement system of any of paragraphs A5.7-A5.9, wherein each securement engager of the at least one securement engager extends through a corresponding securement receiver of the at least one securement receiver when the securement mechanism is in the locked configuration.

A5.11. The payload engagement system of any of paragraphs A5.7-A5.10, wherein each securement engager of the at least one securement engager engages a/the corresponding securement receiver of the at least one securement receiver when the securement mechanism is in the locked configuration.

A5.12. The payload engagement system of any of paragraphs A5.7-A5.11, wherein each securement engager is in an extended position when the securement mechanism is in the locked configuration, and wherein each securement engager is in a retracted position when the securement mechanism is in the unlocked configuration.

A5.13. The payload engagement system of paragraph A5.12, wherein each securement engager is biased toward the extended position.

A5.14. The payload engagement system of paragraph A5.12, wherein each securement engager is biased toward the retracted position.

A5.15. The payload engagement system of any of paragraphs A5.12-A5.14, wherein the securement mechanism further includes at least one securement mechanism actuator configured to transition each securement engager between the extended position and the retracted position.

A5.16. The payload engagement system of paragraph A5.15, wherein each securement mechanism actuator is configured to transition a single corresponding securement engager of the at least one securement engager between the extended position and the retracted position.

A5.17. The payload engagement system of paragraph A5.16, wherein each securement mechanism actuator is configured to transition each of a plurality of securement engagers of the at least one securement engager between the extended position and the retracted position.

A5.18. The payload engagement system of any of paragraphs A5.15-A5.17, wherein each securement mechanism actuator includes at least one of a motor, a servomotor, a screw drive motor, a pneumatic actuator, and a hydraulic actuator.

A6.1. The payload engagement system of any of paragraphs A2.3-A5.18, wherein the at least two insert arms consists of three insert arms; wherein the at least two receptor units consists of three receptor units; wherein the three insert arms are at least substantially evenly distributed about a/the insert component central axis; wherein the three receptor units are configured to be at least substantially evenly distributed about a/the receptor component central axis; wherein each insert arm includes a/the securement mechanism and a/the securement mechanism actuator; wherein each receptor unit includes a/the at least one upper wall that is supported by a/the at least one side wall; wherein at least one upper wall at least partially defines a/the locking chamber recess; wherein at least one side wall at least partially defines a/the locking chamber and is configured to restrict a corresponding insert arm of the three insert arms from rotating out of the locking chamber; and wherein at least one side wall at least partially defines the locking chamber and includes a/the securement receiver.

B. A vehicle configured to transport a payload, wherein the vehicle includes the vehicle supported portion of the payload engagement system of any of paragraphs A-A6.1.

B1.1. The vehicle of paragraph B, wherein the vehicle is at least one of an aircraft, a land-based vehicle, a water vehicle, a submersible water vehicle, and a space vehicle.

B1.2. The vehicle of paragraph B1.1, wherein the vehicle is an unmanned aerial vehicle (UAV).

B1.3. The vehicle of paragraph B1.2, wherein the UAV is a remotely piloted UAV.

B1.4. The vehicle of paragraph B1.2, wherein the UAV is an autonomously controlled UAV.

B1.5. The vehicle of any of paragraphs B1.1-B1.4, wherein the vehicle is a rotorcraft.

B1.6. The vehicle of paragraph B1.5, wherein the rotorcraft includes one of two rotors, three rotors, four rotors, and more than four rotors.

B2.1. The vehicle of any of paragraphs B-B1.6, wherein the vehicle includes an vehicle body, and wherein the vehicle additionally includes a support structure that extends from the vehicle body and supports the vehicle supported portion of the payload engagement system.

B2.2. The vehicle of paragraph B2.1, wherein the support structure includes a gimbal configured to enable the vehicle supported portion to pivot with respect to the vehicle body.

B2.3. The vehicle of any of paragraphs B2.1-B2.2, wherein the support structure includes a rotary element configured to rotate the vehicle supported portion about at least one of a/the insert component central axis and a/the receptor component central axis and with respect to the vehicle body.

C. A method of transporting a payload with a vehicle, the method comprising: engaging the payload with a payload engagement system;

transporting the payload with the vehicle; and disengaging the payload with the payload engagement system;

wherein the payload engagement system includes:

a vehicle supported portion that is supported by the vehicle; and a payload mounted portion that is mounted on the payload;

wherein the engaging includes rotating the vehicle supported portion with respect to the payload mounted portion to transition the payload engagement system from a disengaged configuration to an engaged configuration; and wherein the disengaging includes rotating the vehicle supported portion with respect to the payload mounted portion to transition the payload engagement system from the engaged configuration to the disengaged configuration.

C1.1. The method of paragraph C, wherein the payload engagement system is the payload engagement system of any of paragraphs A-A6.1.

C1.2. The method of any of paragraphs C-C1.1, wherein the vehicle is the vehicle of any of paragraphs B-B2.3.

C2.1. The method of any of paragraphs C-C1.2, wherein the engaging includes, prior to the rotating the vehicle supported portion with respect to the payload mounted portion to transition the payload engagement system from the disengaged configuration to the engaged configuration, aligning the insert component and the receptor component.

C2.2. The method of paragraph C2.1, wherein the aligning includes aligning such that a/the insert component central axis and a/the receptor component central axis are at least substantially parallel.

C2.3. The method of paragraph C2.2, wherein the aligning includes aligning such that the insert component central axis and the receptor component central axis are at least substantially collinear.

C2.4. The method of any of paragraphs C2.1-C2.3, wherein the aligning includes aligning such that a/the insert component plane and a/the receptor component plane are at least substantially parallel.

C2.5. The method of paragraph C2.4, wherein the aligning includes aligning such that a/the insert component plane and a/the receptor component plane are at least substantially coplanar.

C2.6. The method of any of paragraphs C-C2.5, when dependent from paragraph A4.7, wherein the rotating the vehicle supported portion with respect to the payload mounted portion to transition the payload engagement system from the disengaged configuration to the engaged configuration includes inserting each insert arm into a/the locking chamber of the respective receptor unit via a/the antechamber of the respective receptor unit.

C2.7. The method of any of paragraphs C-C2.6, when dependent from paragraph A4.7, wherein the engaging includes, subsequent to the rotating the vehicle supported portion with respect to the payload mounted portion to transition the payload engagement system from the disengaged configuration to the engaged configuration, lifting the vehicle supported portion with respect to the payload mounted portion such that each insert arm is at least partially received a/the locking chamber recess of a/the locking chamber of the respective receptor unit.

C2.8. The method of paragraph C2.7, wherein the lifting includes lifting such that each insert arm is rotationally constrained within the locking chamber recess of the respective receptor unit.

C2.9. The method of any of paragraphs C2.7-C2.8, wherein the lifting includes lifting such that each insert arm contacts a/the upper wall of the respective receptor unit.

C2.10. The method of any of paragraphs C-C2.9, wherein the engaging includes securing the insert component in the engaged configuration via a/the at least one securement mechanism.

C2.11. The method of paragraph C2.10, wherein the securing includes transitioning each securement mechanism from a/the unlocked configuration to a/the locked configuration.

C2.12. The method of any of paragraphs C2.10-C2.11, wherein the securing is performed subsequent to the lifting.

C2.13. The method of any of paragraphs C2.10-C2.11, wherein the securing is performed prior to the lifting.

C2.14. The method of any of paragraphs C-C2.13, wherein the rotating the vehicle supported portion with respect to the payload mounted portion to transition the payload engagement system from the disengaged configuration to the engaged configuration includes rotating the vehicle with respect to the payload to rotate the insert component with respect to the receptor component.

C2.15. The method of any of paragraphs C-C2.14, wherein the rotating the vehicle supported portion with respect to the payload mounted portion to transition the payload engagement system from the disengaged configuration to the engaged configuration includes rotating the vehicle supported portion with respect to the vehicle with a/the rotary element to rotate the insert component with respect to the receptor component.

C2.16. The method of any of paragraphs C-C2.15, wherein the rotating the vehicle supported portion with respect to the payload mounted portion to transition the payload engagement system from the disengaged configuration to the engaged configuration does not include rotating the vehicle with respect to the payload mounted portion.

C3.1. The method of any of paragraphs C-C2.16, wherein the transporting includes transporting such that a/the receptor component central axis remains at least substantially parallel to a/the vertical axis.

C3.2. The method of any of paragraphs C-C3.1, wherein the transporting includes pivoting the vehicle supported portion with respect to the vehicle with a/the gimbal.

C3.3. The method of paragraph C3.2, wherein the pivoting includes pivoting the vehicle supported portion with respect to the vehicle such that the payload remains at least substantially upright as the vehicle tilts with respect to a ground surface.

C4.1. The method of any of paragraphs C-C3.3, when dependent from paragraph A4.7, wherein the rotating the vehicle supported portion with respect to the payload mounted portion to transition the payload engagement system from the engaged configuration to the disengaged configuration includes removing each insert arm from a/the locking chamber of the respective receptor unit via a/the respective antechamber of the respective receptor unit.

C4.2. The method of any of paragraphs C-C4.1, when dependent from paragraph A4.7, wherein the disengaging includes, prior to the rotating the vehicle supported portion with respect to the payload mounted portion to transition the payload engagement system from the engaged configuration to the disengaged configuration, lowering the vehicle supported portion with respect to the payload mounted portion such that each insert arm is removed from a/the locking chamber recess of a/the locking chamber of the respective receptor unit.

C4.3. The method of paragraph C4.2, wherein the lowering includes lowering such that each insert arm contacts a/the receptor base of the respective receptor unit.

C4.4. The method of any of paragraphs C-C4.3, wherein the disengaging includes releasing the insert component by transitioning each of a/the at least one securement mechanism from the locked configuration to the unlocked configuration.

C4.5. The method of paragraph C4.4, wherein the releasing is performed subsequent to the lowering.

C4.6. The method of paragraph C4.4, wherein the releasing is performed prior to the lowering.

C4.7. The method of any of paragraphs C-C4.6, wherein the rotating the vehicle supported portion with respect to the payload mounted portion to transition the payload engagement system from the engaged configuration to the disengaged configuration includes rotating the vehicle with respect to the payload to rotate the insert component with respect to the receptor component.

C4.8. The method of any of paragraphs C-C4.7, wherein the rotating the vehicle supported portion with respect to the payload mounted portion to transition the payload engagement system from the engaged configuration to the disengaged configuration includes rotating the vehicle supported portion with respect to the vehicle with a/the rotary element to rotate the insert component with respect to the receptor component.

C4.9. The method of any of paragraphs C-C4.8, wherein the rotating the vehicle supported portion with respect to the payload mounted portion to transition the payload engagement system from the engaged configuration to the disengaged configuration does not include rotating the vehicle with respect to the payload mounted portion.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer to, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A payload engagement system for selectively coupling a payload to a vehicle, the payload engagement system comprising:
    a vehicle supported portion configured to be supported by the vehicle;
    a payload mounted portion configured to be mounted on the payload; and
    a securement mechanism that includes at least one securement engager and at least one securement receiver;
    wherein one of the vehicle supported portion and the payload mounted portion includes an insert component; wherein the other of the vehicle supported portion and the payload mounted portion includes a receptor component; wherein the payload engagement system is configured to transition between a disengaged configuration and an engaged configuration at least partially via rotation of the insert component with respect to the receptor component; wherein, in the engaged configuration, the receptor component receives the insert component and engages the insert component such that the insert component is rotationally constrained within the receptor component to enable the vehicle to carry the payload; wherein the insert component includes the at least one securement engager, wherein the receptor component includes the at least one securement receiver, and wherein each securement receiver of the at least one securement receiver is configured to selectively receive a corresponding securement engager of the at least one securement engager when the payload engagement system is in the engaged configuration to at least partially restrict the payload engagement system from transitioning from the engaged configuration to the disengaged configuration.

2. The payload engagement system of claim 1, wherein the vehicle supported portion includes the insert component and the payload mounted portion includes the receptor component.

3. The payload engagement system of claim 1, wherein the payload engagement system further is configured to transition between the disengaged configuration and the engaged configuration via translation of the insert component with respect to the receptor component along a vertical axis.

4. The payload engagement system of claim 1, wherein the insert component includes at least two insert arms, and wherein the receptor component includes at least two receptor units corresponding to the at least two insert arms.

5. The payload engagement system of claim 4, wherein the at least two insert arms are distributed about an insert component central axis of the insert component; wherein the at least two receptor units are distributed about a receptor component central axis of the receptor component; wherein each insert arm extends radially from the insert component central axis; and wherein the insert component central axis and the receptor component central axis are at least substantially parallel when the payload engagement system transitions between the disengaged configuration and the engaged configuration.

6. The payload engagement system of claim 4, wherein each receptor unit includes a ramp portion configured to facilitate a corresponding insert arm entering the receptor unit, and wherein the ramp portion extends between an upper surface of the payload and a receptor base of the receptor unit and oblique to the upper surface.

7. The payload engagement system of claim 4, wherein each receptor unit includes an antechamber and a locking chamber; wherein the antechamber has an antechamber height; wherein the locking chamber has a locking chamber height; wherein the locking chamber height is greater than the antechamber height; and wherein a corresponding insert arm is received in the locking chamber when the payload engagement system is in the engaged configuration.

8. The payload engagement system of claim 1, wherein the securement mechanism is configured to be selectively transitioned between an unlocked configuration, in which the securement mechanism does not restrict the payload engagement system from transitioning from the engaged configuration to the disengaged configuration, and a locked configuration, in which the securement mechanism at least partially restricts the payload engagement system from transitioning from the engaged configuration to the disengaged configuration.

9. The payload engagement system of claim 8, wherein each securement engager of the at least one securement engager extends through a corresponding securement receiver of the at least one securement receiver when the securement mechanism is in the locked configuration.

10. The payload engagement system of claim 9, wherein each securement engager of the at least one securement engager includes at least one of a pin and a bolt; and wherein each securement receiver of the at least one securement receiver includes at least one of a hole and an aperture through which the corresponding securement engager extends when the securement mechanism is in the locked configuration.

11. The payload engagement system of claim 8, wherein each securement engager is in an extended position when the securement mechanism is in the locked configuration; wherein each securement engager is in a retracted position when the securement mechanism is in the unlocked configuration; and wherein the securement mechanism further includes at least one securement mechanism actuator configured to transition each securement engager between the extended position and the retracted position.

12. A vehicle configured to transport a payload, wherein the vehicle includes the vehicle supported portion of the payload engagement system of claim 1.

13. The vehicle of claim 12, wherein the vehicle is an unmanned aerial vehicle (UAV).

14. The vehicle of claim 12, wherein the vehicle includes a vehicle body, wherein the vehicle additionally includes a support structure that extends from the vehicle body and supports the vehicle supported portion of the payload engagement system, and wherein the support structure includes a rotary element configured to rotate the vehicle supported portion about at least one of an insert component central axis and a receptor component central axis and with respect to the vehicle body.

15. A method of transporting a payload with a vehicle, the method comprising:
  engaging the payload with a payload engagement system;
  transporting the payload with the vehicle; and
  disengaging the payload with the payload engagement system;
  wherein the payload engagement system includes:
    a vehicle supported portion configured to be supported by the vehicle;
    a payload mounted portion configured to be mounted on the payload; and
    a securement mechanism that includes at least one securement engager and at least one securement receiver;
  wherein one of the vehicle supported portion and the payload mounted portion includes an insert component that includes the at least one securement engager; wherein the other of the vehicle supported portion and the payload mounted portion includes a receptor component that includes the at least one securement receiver; wherein the engaging includes rotating the vehicle supported portion with respect to the payload mounted portion to transition the payload engagement system from a disengaged configuration to an engaged configuration; wherein the disengaging includes rotating the vehicle supported portion with respect to the payload mounted portion to transition the payload engagement system from the engaged configuration to the disengaged configuration; and wherein each securement receiver of the at least one securement receiver is configured to selectively receive a corresponding securement engager of the at least one securement engager when the payload engagement system is in the engaged configuration to at least partially restrict the payload engagement system from transitioning from the engaged configuration to the disengaged configuration.

16. The method of claim 15, wherein one of the vehicle supported portion and the payload mounted portion includes an insert component; wherein the other of the vehicle supported portion and the payload mounted portion includes a receptor component; and wherein the engaging includes, prior to the rotating the vehicle supported portion with respect to the payload mounted portion to transition the payload engagement system from the disengaged configuration to the engaged configuration, aligning the insert component and the receptor component.

17. The method of claim 15, wherein one of the vehicle supported portion and the payload mounted portion includes an insert component; wherein the other of the vehicle supported portion and the payload mounted portion includes a receptor component; wherein the insert component includes at least two insert arms; wherein the receptor component includes at least two receptor units corresponding to the at least two insert arms; wherein each receptor unit includes an antechamber and a locking chamber; wherein the antechamber has an antechamber height; wherein the locking chamber has a locking chamber height; wherein the locking chamber height is greater than the antechamber height; and wherein the rotating the vehicle supported portion with respect to the payload mounted portion to transition the payload engagement system from the disengaged configuration to the engaged configuration includes inserting each insert arm into the locking chamber of a respective receptor unit via a respective antechamber of the respective receptor unit.

18. The method of claim 17, wherein the engaging includes, subsequent to the rotating the vehicle supported portion with respect to the payload mounted portion to transition the payload engagement system from the disengaged configuration to the engaged configuration, lifting the vehicle supported portion with respect to the payload mounted portion such that each insert arm is at least partially received in a locking chamber recess of the locking chamber of the respective receptor unit.

19. The method of claim 18, wherein the disengaging includes, prior to the rotating the vehicle supported portion with respect to the payload mounted portion to transition the payload engagement system from the engaged configuration to the disengaged configuration, lowering the vehicle supported portion with respect to the payload mounted portion such that each insert arm is removed from the locking chamber recess of the locking chamber of the respective receptor unit.

20. The method of claim 15, wherein the securement engager is configured to engage the securement receiver when the payload engagement system is in the engaged configuration to at least partially restrict the payload engagement system from transitioning from the engaged configuration to the disengaged configuration; wherein the securement mechanism is configured to be selectively transitioned between an unlocked configuration, in which the securement mechanism does not restrict the payload engagement system from transitioning from the engaged configuration to the disengaged configuration, and a locked configuration, in which the securement mechanism at least partially restricts the payload engagement system from transitioning from the engaged configuration to the disengaged configuration; and wherein the engaging includes securing the insert component in the engaged by transitioning the securement mechanism from the unlocked configuration to the locked configuration.

21. The method of claim 20, wherein the disengaging includes releasing the insert component by transitioning the securement mechanism from the locked configuration to the unlocked configuration.

22. The method of claim 15, wherein the securement mechanism is configured to be selectively transitioned between an unlocked configuration, in which the securement mechanism does not restrict the payload engagement system from transitioning from the engaged configuration to the disengaged configuration, and a locked configuration, in which the securement mechanism at least partially restricts the payload engagement system from transitioning from the engaged configuration to the disengaged configuration; wherein each securement engager is in an extended position when the securement mechanism is in the locked configuration; wherein each securement engager is in a retracted position when the securement mechanism is in the unlocked configuration; and wherein the securement mechanism further includes at least one securement mechanism actuator configured to transition each securement engager between the extended position and the retracted position.

23. The method of claim 22, wherein the engaging includes securing the insert component in the engaged configuration via the securement mechanism; and wherein the securing includes transitioning the securement mechanism from the unlocked configuration to the locked configuration with the at least one securement mechanism actuator.

24. The method of claim 15, wherein the securement mechanism is configured to be selectively transitioned between an unlocked configuration, in which the securement mechanism does not restrict the payload engagement system from transitioning from the engaged configuration to the disengaged configuration, and a locked configuration, in which the securement mechanism at least partially restricts the payload engagement system from transitioning from the engaged configuration to the disengaged configuration; wherein each securement engager of the at least one securement engager includes at least one of a pin and a bolt; and wherein each securement receiver of the at least one securement receiver includes at least one of a hole and an aperture through which the corresponding securement engager extends when the securement mechanism is in the locked configuration.

25. The method of claim 24, wherein the engaging includes securing the insert component in the engaged configuration via the securement mechanism; and wherein the securing includes transitioning the securement mechanism from the unlocked configuration to the locked configuration such that each securement engager of the at least one securement engager extends through a corresponding securement receiver of the at least one securement receiver.

* * * * *

UNITED STATES PATENT AND TRADEMARK OFFICE
CERTIFICATE OF CORRECTION

PATENT NO. : 10,814,983 B2
APPLICATION NO. : 15/954426
DATED : October 27, 2020
INVENTOR(S) : Allison M. Feldman et al.

It is certified that error appears in the above-identified patent and that said Letters Patent is hereby corrected as shown below:

In the Claims

Claim 20, Column 26, Line 5, insert --configuration-- after "engaged"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*